March 10, 1953　　D. H. MONTGOMERY　　2,631,072
SPINDLE BEARING
Filed Oct. 23, 1946　　　　　　　　　　2 SHEETS—SHEET 2
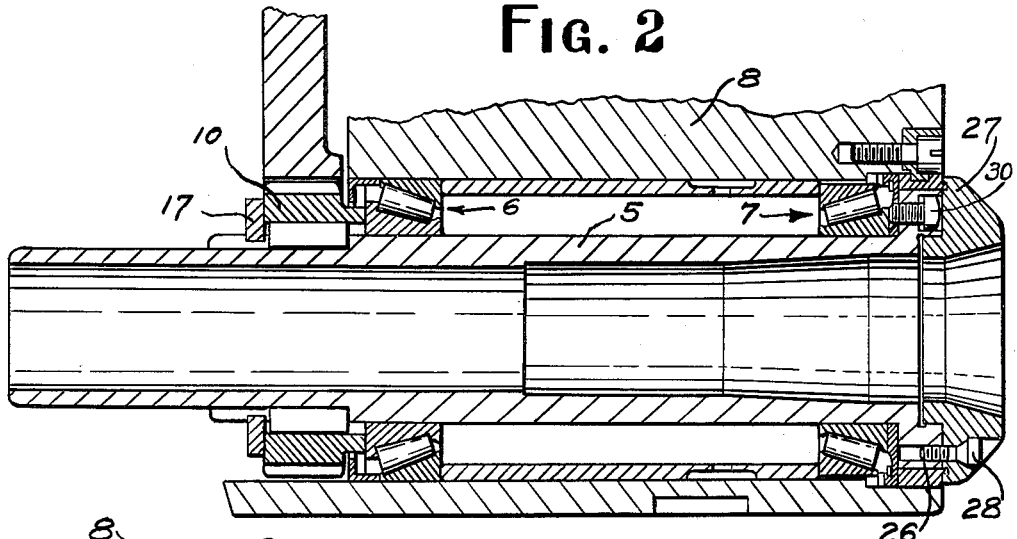
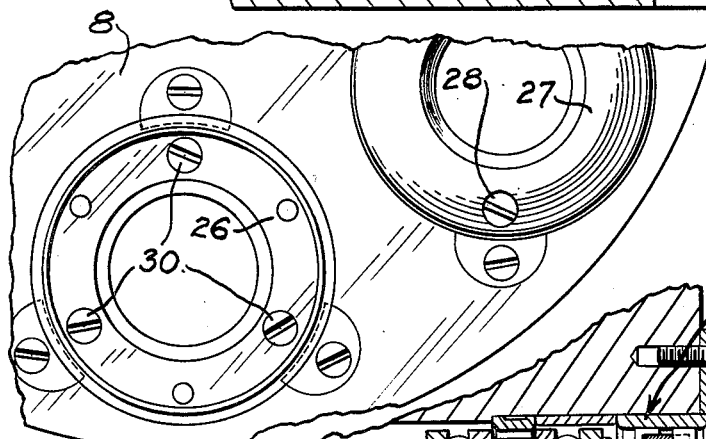
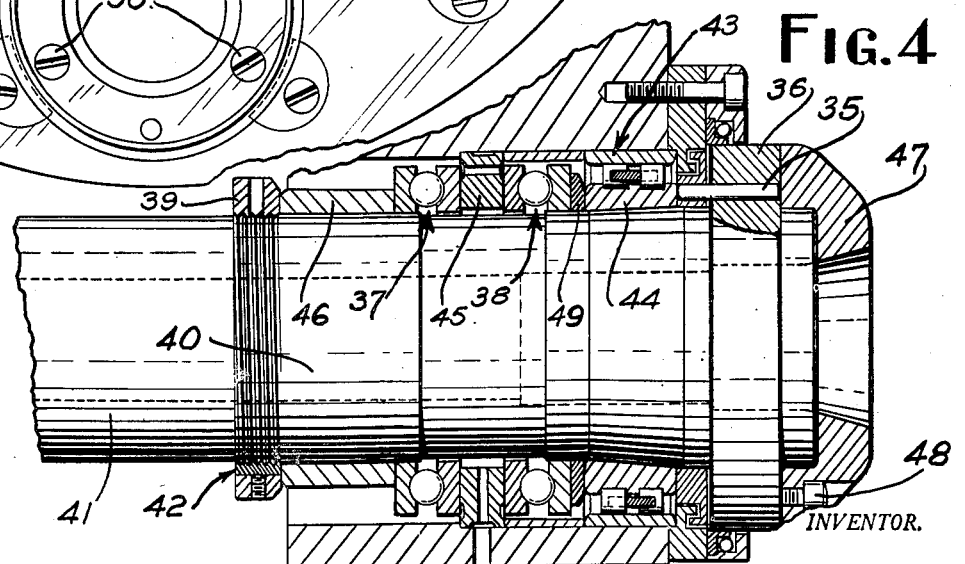
INVENTOR.
BY DONALD H. MONTGOMERY
*Mitchell Bechert*
ATTORNEYS Patented Mar. 10, 1953

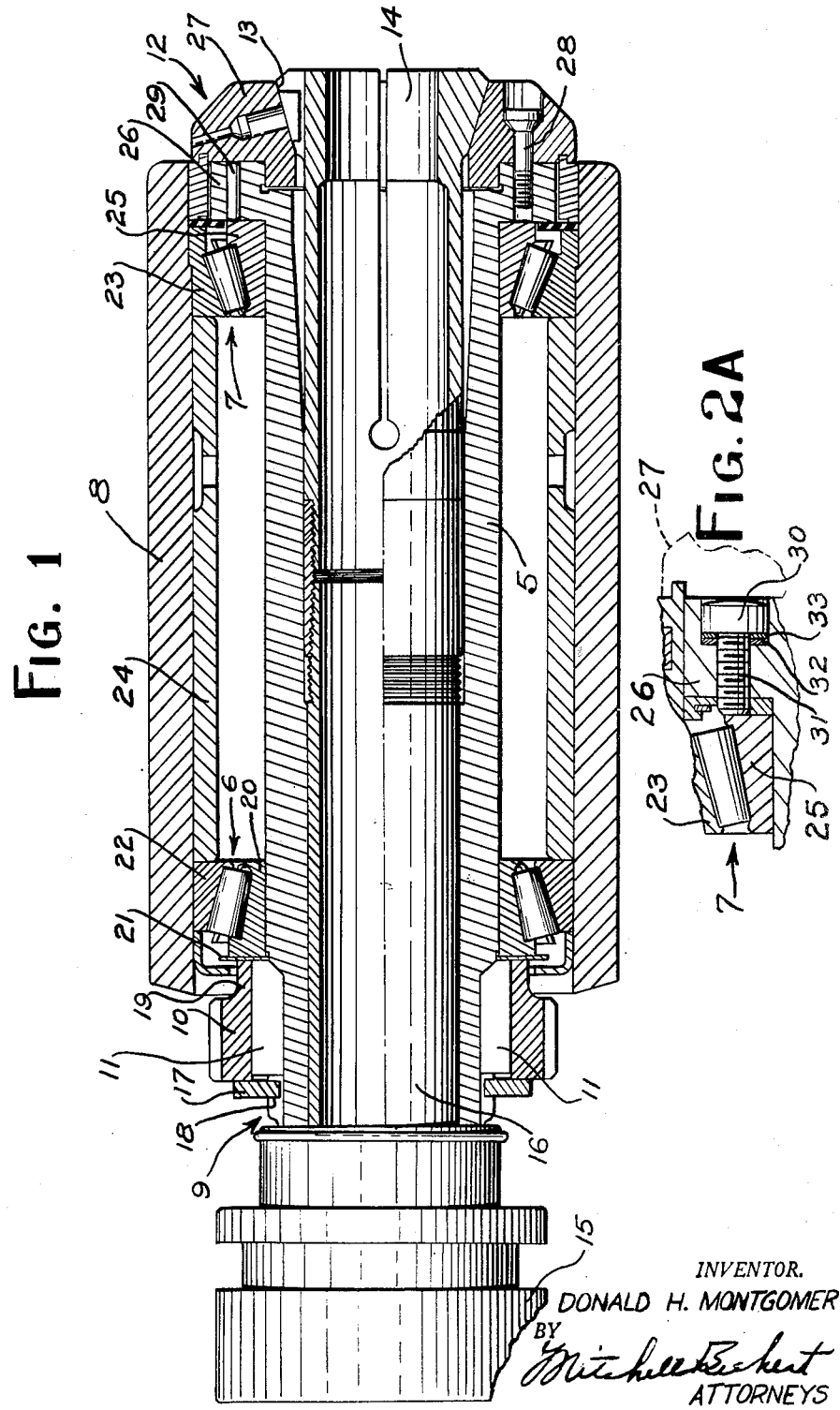

2,631,072

UNITED STATES PATENT OFFICE 2,631,072

SPINDLE BEARING

Donald H. Montgomery, West Hartford, Conn., assignor to The New Britain Machine Company, New Britain, Conn., a corporation of Connecticut Application October 23, 1946, Serial No. 705,199

1 Claim. (Cl. 308—207)

My invention relates to spindle mountings.

In anti-friction-bearing spindle mountings, it is common practice to preload the bearings. Preloading is often accomplished by a nut or other adjustable means at the back end of the spindle. In many cases, such as in multiple-spindle screw machines, the usual adjusting nut at the back of the spindle is quite inaccessible. Furthermore, a preload-adjusting nut which is available for adjustment to the operator of a machine is likely to be turned up too much and the bearings seriously overloaded. Safety devices to prevent such overload usually consist of spacer sleeves against which the bearing rings abut, so that when the adjusting nut is turned up as tight as it can be, there will be no serious overloading by reason of the interposition of such spacer sleeves. When spacer sleeves are employed, it is necessary to dismantle the entire spindle mounting in order to vary the lengths of the spacer sleeves—should it be desirable or necessary to vary the preload on the bearings. My invention contemplates means to avoid many of these difficulties of the prior art, as will be indicated.

It is an object of my invention to provide an improved spindle mounting.

It is another object to provide improved means for preloading a spindle bearing.

It is a more specific object to provide means for adjustably preloading, from the nose end, the thrust-receiving anti-friction bearings of a spindle mounting.

It is, in general, an object to accomplish the above purposes with a view particularly to ease of making initial adjustments and of servicing the machine as parts become worn.

Other objects and various further features of the invention will be pointed out or will occur to those skilled in the art from a reading of the following specification in conjunction with the accompanying drawings. In said drawings:

Fig. 1 is a partly broken-away sectional view of a spindle mounting incorporating features of the invention;

Fig. 2 is a sectional view of a modification of the mounting of Fig. 1;

Fig. 2A is an enlarged fragmentary sectional view illustrating the cooperation of certain parts of the mounting of Fig. 2;

Fig. 3 is a fragmentary end elevation of a spindle carrier and spindles according to Fig. 2, with the nose piece for one spindle removed to illustrate internal arrangements; and Fig. 4 is a partly broken-away sectional view of an alternative embodiment according to the invention.

Broadly speaking, my invention contemplates means adjustable from the spindle-nose end of a machine for adjustably preloading a plurality of bearings in a spindle mounting. In one specific form to be described, there is a non-adjustable bearing abutment spaced from the spindle nose, and longitudinally extending spacer pins or the like, of various selected lengths, are interposed between the spindle nose and the nearest thrust-receiving portion of a bearing, whereby the bearings are correspondingly variously preloaded or squeezed between the abutment and the spindle nose (via the pins). In another specific form, screw means extending into abutment with the nearest thrust-receiving portion of a bearing are employed in place of the pins, and preloading adjustment is preferably obtained by appropriate selection of the thickness of seating washers or shims for the screw means. In a further specific arrangement, the abutment is adjustable longitudinally, and spacer pins or the like serve both to preload bearings and to limit the fit of tapered interfitting surfaces.

Referring to Fig. 1 of the drawings, my invention is shown in application to a bar machine having a spindle 5 revolubly supported by antifriction bearings 6—7 within a spindle carrier 8. The spindle 5 at the back or driven end 9 carries gear means 10 keyed thereto, as at 11, for driving purposes, and has work-holding means at the nose or front end 12. To support work within the spindle 5, the nose 12 may include an outwardly flaring collet seat 13 to receive collet means 14 of conventional construction. In the form shown, the collet means 14 is of the so-called draw-back type, which may be actuated by a draw-back sleeve or collar 15, coupled by a collet tube 16 to the collet means 14. The anti-friction bearing means 6—7 includes means for providing both radial and end-thrust support and, in the form shown, these bearings are of the tapered-roller type, with the races and rollers of one bearing opposed to the rollers and races of the other bearing. The parts which have thus far been described are well known and, therefore, form no part of my invention.

In accordance with the invention, means are provided accessible at the nose end of the spindle 5 for adjustably preloading the bearings 6—7. To accomplish this function, the back bearing 6 may be substantially fixedly located by means of a snap-ring or collar 17 receivable in a circumferentially extending groove 18 and extending radially outward sufficient to provide a longitudinal abutment for the gear 10. The gear 10 in turn may include a forwardly projecting portion or hub 19 in direct abutment with the thrust-receiving end of one of the race rings 20 of the bearing 6. If desired, a shim or washer 21, which may act as a seal, may be placed between the gear hub 19 and the roller-race ring 20. In the form shown, the thrust-receiving end of the other race ring 22 of the bearing 6 is fixedly spaced longitudinally from the thrust-receiving portion of the corresponding race ring 23 of the front bearing 7, by means of a spacer sleeve 24 which may slidably fit the inner wall of the spindle carrier 8. To complete the bearing mounting, I employ a novel preloading mechanism which includes means carried by a radially outwardly extending portion of the nose 12 for selectable longitudinal abutment with the thrust-receiving end of the other race ring 25 of the front bearing 7.

In the form shown, the novel preloading adjustment is accomplished by making the nose 12 in essentially two parts—a radially outwardly extending flange 26 (shown integrally formed with the spindle 5) and a separate nose piece 27, which may be secured as by screw means 28 to the flange 26. The flange 26 includes a longitudinally extending aperture slidingly to receive a spacer member or pin 29 of length greater than the thickness of the flange 26. Preferably, a plurality of spacer pins 29 are provided circumferentially spaced about the flange 26. It will be appreciated that by virtue of the length of the spacer pin 29 a securing of the nose piece 27 to the flange 26 may force an abutment of the nose piece 27 with the thrust-receiving end of the race ring 25 via the spacer pins 29. It will be clear that the preloading thrust of the nose piece 27 will be transmitted through the spacer pins 29 to the inner ring of the bearing 7, through that bearing and sleeve 24 to the outer ring 22 of the rear bearing 6, and through the rear bearing to the gear 10 and the fixed abutment 17. It will further be appreciated that depending upon the length of the pins 29 selected, various degrees of preloading of the bearings 6 and 7 may be effected.

Referring to Figs. 2, 2A, and 3, my invention is shown in application to a modification of the arrangement of Fig. 1 in which an alternative preloading mechanism is accessible from the nose end of the spindle assembly. Although this modification is shown without a collet mechanism, the spindle 5, bearings 6 and 7, the snap-ring abutment 17, the drive gear 10, the flange 26, and the nose piece 27 will all be recognized from the previous description. In accordance with the modification of Fig. 2, the preloading adjustment does not rely upon the nose piece 27 but rather upon a longitudinally adjustable mechanism, which may be threadedly carried by the flange 26 and which projects rearwardly into abutment with the thrust-receiving end of the race ring 25. In the form shown (see Fig. 2A for detail), this threaded adjustment is accomplished by a screw 30 having an enlarged head receivable in a counterbore in the flange 26. The shank 31 of the bolt 30 projects rearwardly of the flange 26 for abutment with the race ring 25. To provide desired adjustment of the extent of this projection of the shank 31, shims 32—33 of selected total thickness may be inserted beneath the head of the screw 30, to adjust the seating position thereof. It will be appreciated that the described alternative arrangement provides essentially the same preloading of the bearings 6 and 7, as described for Fig. 1, and that this preloading may be firmly maintained by adequately securing the screws 30 in their selected seated positions, regardless of whether the nose piece 27 may be fixed to or removed from the spindle 5.

Referring to Fig. 4, there is shown another embodiment of the invention in which a spindle is supported by separate radial and end-thrust-receiving anti-friction bearing means. The radial bearing is shown in the form of a double-row cylindrical roller bearing 43. In this embodiment, spacer-pin means 35 slidably supported in a longitudinally extending aperture in a spindle flange 36 are employed for effecting the preloading of the end-thrust-bearing means 37—38. For abutment of the preloading system at the back end of the spindle mounting an abutment collar 39 may be threadedly secured to an enlarged portion 40 of the spindle 41. Suitable locking means 42 on the abutment collar 39 may serve to hold the abutment collar 39 against unthreading dislodgment from its adjusted position on the spindle 41. Since, in the form shown, the radial-bearing means 43 of the spindle mounting assumes none of the end-thrust load, one of the race rings 44 of the radial bearing 43 may be employed as a longitudinal spacer, to assist the functioning of the thrust-bearing preloading mechanism. Other spacers, such as a ring 45 between the bearings 37 and 38, and a sleeve 46 between the bearing 37 and the abutment collar 39, may also be employed as needed. As in the case of Fig. 1, the nose piece 47 in Fig. 4 may be secured as by screws 48 to the flange 36 of the spindle 41. It will then be clear that with the arrangement described, the end-thrust preloading is essentially the same as that described for Fig. 1—the compressional forces existing between the nose piece 47 and the threaded engagement of the abutment 41 (via the spacer pins 35, the radial-bearing race ring 44, a spacer element 49, the thrust bearing 38, the spacer element 45, the thrust bearing 37, and the spacer sleeve 46).

It should be noted that in the arrangement of Fig. 4, the end-thrust-bearing preloading system may also be employed to maintain a given seating fit of the race ring 44 upon the spindle 41. In the form shown, this fit is between two conically tapering surfaces on the ring and on the spindle. Thus, the pins 35 serve both to limit the fit of the inner ring 44 on its tapered seat and to determine the extent of radial preload of the radial bearing 43. It will be clear that screw means of Fig. 2A could be employed in the modification shown in Fig. 4 instead of the pins 35.

It will be appreciated that I have described novel mechanisms for effecting, at the front end of a bar machine, simple preloading adjustment of anti-friction bearings of the spindle mounting. Except in a first assembly of the machine or in a major overhauling, there is no need to have access to the rear of the machine in order to effect or to adjust preloading of the bearing means. As thrust-receiving bearings become worn in use, there is need for adjustment of the preloading, but the only servicing necessary in this connection is either selection of slightly longer spacer pins 29 or 35 in the cases of Figs. 1 and 4, respectively, or of new shims 32—33 for the other described embodiment. All of these adjustments are clearly possible from the front or nose end of the spindle assembly, and Fig. 3 illustrates how simple this adjustment can be made for the case of replacing shims merely by the removal of the screws 30.

While in the illustrative embodiments of the invention shown the preloading adjustment means are all carried with the spindle, it is to be understood that other arrangements are possible and that various modifications and changes may be made within the scope of the invention as defined in the appended claim.

I claim:

In a spindle machine of the character indicated, a spindle having a nose end, thrust-receiving bearing means on said spindle, an abutment on the other side of said bearing means from said nose end, a radially outwardly extending flange on said spindle at the nose end thereof, and adjustable longitudinally extending loading means for said bearing and including a plurality of angularly spaced longitudinally extending pins supported by and extending through said flange, whereby said pins may be accessible from the nose side of said flange, said pins including portions projecting rearwardly of said flange for abuttingly preloading said bearing, a single circumferentially continuous loading ring in longitudinal overlapping relation with said pins at the nose end of said spindle, and adjustable securing means for moving said ring bodily longitudinally for clamping said ring against said flange, said abutment including a snap ring, and a radial abutment on said spindle for said snap ring, said other side of said spindle being of no greater diameter than the bore of said bearing means, whereby said spindle may be inserted in said bearing means from the nose end, and whereby placement of said snap ring may be the only rearwardly accessible operation necessary in a properly preloaded assembly of said spindle in said machine.

DONALD H. MONTGOMERY.

REFERENCES CITED

The following references are of record in the file of this patent:

UNITED STATES PATENTS

| Number | Name | Date |
|---|---|---|
| 312,277 | Latta | Feb. 17, 1885 |
| 517,235 | Pettit | Mar. 27, 1894 |
| 1,617,349 | Sanders | Feb. 15, 1927 |
| 1,966,905 | Ruth | July 17, 1934 |
| 1,982,265 | Nenninger | Nov. 27, 1934 |
| 2,036,685 | Drissner | Apr. 7, 1936 |
| 2,103,912 | Montgomery | Dec. 28, 1937 |